Patented Nov. 10, 1942

2,301,356

UNITED STATES PATENT OFFICE 2,301,356

COPOLYMERS OF CYCLIC IMIDES OF DICARBOXYLIC ACIDS

Harold Wilfred Arnold, Marshallton, and Merlin Martin Brubaker and George Lowrance Dorough, Wilmington, Del., assignors to E. I. du Pont de Nemours & Company, Wilmington, Del., a corporation of Delaware Application August 1, 1940, Serial No. 349,252

7 Claims. (Cl. 260—94.)

This invention relates to new polymeric products and more particularly to products formed by the copolymerization of combinations of certain unsaturated compounds.

It is known that cyclic imides of olefine dicarboxylic acids or N-substituted derivatives of these imides may be polymerized by heating with peroxidic polymerization catalysts to give solid polymers. These polymers because of their poor strength, are of little or no value in plastics applications. Useful polymeric materials have been produced by the copolymerization of cyclic imides of olefin dicarboxylic acids or N-substituted derivatives of these imides with readily polymerizable unsaturated compounds, e. e., compounds containing an ethylenic double bond in which the doubly bonded carbon atom is also attached to a negative group. Such compounds are vinyl chloride, vinyl esters of organic acids, styrene, vinyl ethers, methyl vinyl ketone, and acrylic esters. These compounds are generally quite expensive, and their use results in copolymers whose cost precludes their use in many plastics applications.

This invention has as an object the preparation of new copolymers of cyclic imides of olefin dicarboxylic acids. A further object is the preparation of these from low cost materials. A further object is the preparation of copolymers of these cyclic imides with difficultly polymerizable organic compounds. Other objects will appear hereinafter.

These objects are accomplished by the following invention wherein a cyclic imide of an olefin dicarboxylic acid, including the N-hydrocarbon substituted cyclic imides, is copolymerized with an unsaturated compound which contains a methylene (CH₂) group attached by an ethylenic double bond to a carbon atom, all of whose remaining valences are satisfied by hydrogen or by only singly bonded carbon.

The more detailed practice of the invention is illustrated by the following examples, wherein parts given are by weight. There are of course many forms of the invention other than these specific embodiments.

Example I

A mixture of 10 parts of N-n-butylmaleimide and 10 parts of isobutylene containing 0.015 part of benzoyl peroxide is placed in a pressure vessel and heated at 50° C. for 136 hours. At the end of this time the vessel is opened to allow excess isobutylene to boil off. The polymer is then removed and amounts to 12.5 parts. The product molds to a clear, virtually colorless, tough article which becomes flexible at 125° C. when immersed in a heated oil bath. Analysis shows the product to contain approximately equimolar proportions of the ingredients.

Example II

A mixture of 11.2 parts of diisobutylene, 15.3 parts of N-n-butylmaleimide, and 0.013 part of benzoyl peroxide is heated in a closed glass vessel for 40 hours at 65° C. At the end of this time the vessel is opened, an additional 0.012 part of benzoyl peroxide added, and heating is thereafter continued for 32 hours. At the end of this period a very viscous solution has been formed. This is poured into methanol, giving a finely divided white precipitate which after thorough washing with methanol and drying at 70° C. amounts to 13.5 parts. A portion of the product molds to an amber-colored, hard article which shows a high softening point.

Example III

A mixture of 11.2 parts of diisobutylene and 15.3 parts of N-isobutylmaleimide is polymerized and the polymer isolated as in Example II. The yield of polymer amounts to 12.0 parts. It can be molded to a hard, amber-colored, high softening article.

Example IV

A mixture of 8.6 parts of allyl formate, 13.9 parts of N-n-butylmaleimide, and 0.2 part of benzoyl peroxide is heated at 65° C. for 16 hours, at the end of which time the mixture has solidified to a clear, light-colored, hard mass.

Example V

A mixture of 60 parts of propylene, 20 parts of N-n-butylmaleimide, 80 parts of toluene, and 0.3 part of benzoyl peroxide is heated at 85–90° C. for 12 hours in a silver-lined steel pressure vessel. At the end of this time the residual low boiling material is vented off and the vessel opened. A portion of the product has precipitated out on the sides of the vessel while the remainder remains in solution in the toluene. This precipitate when molded yields an article which becomes flexible at approximately 80–83° C. when heated in an oil bath. The remainder of the product is recovered by evaporating off the toluene. Both products on analysis are found to contain approximately equimolar proportions of the ingredients.

In the copolymerizations of this invention, any cyclic imide of an olefin dicarboxylic acid may be employed including the cyclic imides of maleic, citraconic, dimethylmaleic, benzylmaleic, phenylmaleic, itaconic, vinylsuccinic, and halogen substituted maleic acids. The imides of those acids wherein the carboxyls are on the doubly bonded carbons are preferred. The imido hydrogen may be replaced by hydrocarbon groups, e. g., alkyl, cycloalkyl, and aralkyl groups such as methyl, ethyl, propyl, n-butyl, isobutyl, cyclopentyl, cyclohexyl, benzyl, etc. The substituted imides containing aryl groups on the imide nitrogen tend to be dark colored, and their copolymerization is less ready than that of the imides containing alkyl, cycloalkyl, or aralkyl groups. The preferred imides are the maleic imides which are substituted on the nitrogen atom by lower alkyl (i. e., 1-4 carbon atoms) groups such as methyl, ethyl, propyl, butyl and isobutyl. These are preferred because of their relatively low cost and ease of production. Unsubstituted maleimide, while operable, is difficult to obtain, being produced in only small yields by the controlled oxidation of pyrrol.

While it is preferred to use as starting materials the pure imides of the olefin dicarboxylic acids, it is possible to prepare these in situ without the isolation of intermediate products. Thus maleic anhydride may be treated with an equimolar quantity of the selected amine and the mixture heated in vacuo to remove as far as possible the water produced in the ring closure reaction undergone by the N-substituted maleamic acid which is formed as an intermediate. To the resulting mixture is added the ethylenic compound and catalyst, and the polymerization carried out in the usual manner.

The N-substituted imides of the unsaturated dicarboxylic acids are readily prepared according to the following reaction scheme as illustrated with maleic anhydride and an amine:

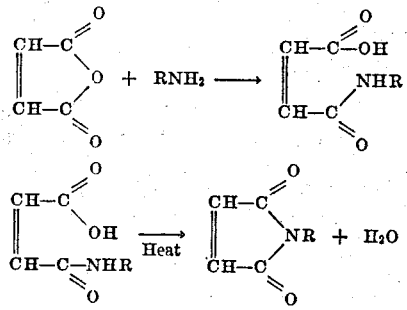

Ordinarily no catalyst is required in these reactions, although in the second step the presence of a dehydrating agent may be beneficial. Yields in the first stage are usually quantitative or nearly so, and in the second stage may be as high as 65-85 per cent.

In the copolymerizations, any difficultly polymerizable olefine having attached to the ethylenically bonded carbons only hydrogen and/or only singly bonded carbon may be employed including, in addition to those disclosed in the examples, 1-butene, 1-pentene, 1-hexene, Δ-5,6-hexenonitrile, allyl esters of carboxylic acids, allyl amides, ortho-allylphenyl acetate, ethyl N-allyl acetanilide, etc.

The ethylenic compounds used in this invention are for the most part available as by-products in the petroleum industry or may be produced readily from these products.

The unsaturated compounds which it is preferred to use in this invention are the simple monoolefin hydrocarbons which are obtainable at low cost from the petroleum industry. These include ethylene, propylene, isobutylene, and 2,4,4-trimethylpentene-1, the latter being the chief constituent of diisobutylene which is obtained commercially by dimerization of isobutylene.

In the preparation of the copolymers of the present invention equimolar quantities of the imide and the unsaturated compound are ordinarily employed, but in certain cases an excess of one ingredient may be advantageous in promoting the copolymerization. It appears that regardless of the initial monomer proportions, the copolymers formed contain no more than equimolar proportions of the olefinic compound.

Because the N-substituted maleimides tend to hydrolyze in aqueous systems, particularly those which are acidic or basic, the copolymerizations with the olefins are preferably carried out in nonaqueous systems. Thus the mixture of the maleimide and olefin without added diluent may be heated, usually at temperatures in the range of 40°-85° C. after the addition of 0.1-1.0 per cent of a peroxidic polymerization catalyst such as benzoyl peroxide. The polymerization is exothermic and usually proceeds quite rapidly but without violence. In order to produce a copolymer of relatively uniform high molecular weight it is frequently desirable to provide a means of regulating the temperature within the polymerizing mass. For example, the polymerization vessel may be fitted with an internal coil through which a cooling medium such as water can be circulated if necessary to prevent undue temperature fluctuations.

Since the simple olefins may be immiscible with certain of the N-substituted maleimides, a solvent which does not react with either of the monomers may be added to produce a homogeneous reaction mixture. Such solvents are aromatic or aliphatic hydrocarbons, ketones, esters, dioxans, chlorinated hydrocarbons, ethers, and the like. The polymeric products are generally soluble in these solvents. Ordinarily when a solvent is used, the polymerization is more readily controlled. At the same time the products tend to exhibit a lower average molecular weight than those prepared without added diluents.

While it is preferable that the copolymerization be carried out in the absence of water to minimize the danger of hydrolysis of the monomeric imides, it is possible to conduct the polymerizations in aqueous systems by the emulsion method or by the so-called "granular" technique as disclosed in U. S. 2,191,520, if precautions are taken to maintain the system at or very near the neutral point and to prevent the temperature from rising unduly.

With higher boiling olefins such as 2,4,4-dimethylpentene-1 or methylenecyclohexene the copolymerization is conveniently carried out in an open vessel equipped with a reflux condenser. On the other hand since ethylene, propylene, and isobutylene are all gases at ordinary temperatures, copolymerizations involving these compounds must ordinarily be conducted in closed pressure vessels. A more refined procedure which ordinarily induces polymerization in a shorter time consists in flushing out and filling the free space of the polymerization vessel with an inert gas such as nitrogen, carbon dioxide, or hydrogen, either under atmospheric pressure or at pressures up to 1000-2000 pounds per square inch.

While the preferred temperature range for the production of copolymers of this invention is from about 40°–85° C., temperatures outside this range may be used, e. g., about 30°–120° C.

The time required for the copolymerization of olefin dicarboxylic acid imides and ethylenic compounds is largely dependent on the reaction conditions used, and may vary from several hours to several days.

The copolymers herein described may be prepared in bulk in containers of any shape to give castings having the shape of the container. They may also be shaped or formed by sawing, drilling, filing, turning, etc. They may be molded by the known methods of molding and may be formed into films or foils by casting from solutions or by hot pressing. Fibers may be spun from solutions of the polymers. They may be employed in the preparation of molded articles when modified with plasticizers, pigments, dyes, and other natural or synthetic resins. They may also be used as adhesives, and as coating compositions either alone or when mixed with other resins, dyes and plasticizers. Such compositions may be used for coating or impregnating surfaces such as wood, textiles, leather, metals, glass, papers, stone, plaster, and the like.

Certain of the copolymers may be rendered alkali- or water-soluble by treatment with acidic or alkaline inorganic or organic reagents. The resulting products may be used as tanning agents, photographic chemicals, agents for treating textile materials, petroleum chemicals, protein hardeners, alkyd resin ingredients, and the like.

The above description and examples are intended to be illustrative only. Any modification of or variation therefrom which conforms to the spirit of the invention is intended to be included within the scope of the claims.

What is claimed is:

1. A copolymer of a cyclic imide of an olefin dicarboxylic acid having an alkyl radical of from one to four carbon atoms on the imide nitrogen with a completely aliphatic monoolefine hydrocarbon having a terminal methylene ($CH_2$) group.

2. A copolymer of an N-lower alkyl maleimide with a completely aliphatic hydrocarbon having a $CH_2$ group ethylenically double bonded to the remainder of the molecule.

3. A copolymer of N-n-butylmaleimide with isobutylene.

4. Process of obtaining copolymers which comprises heating N-n-butylmaleimide with an equal weight of isobutylene at 50° C. for 136 hours in the presence of benzoyl peroxide.

5. A copolymer of a cyclic imide of an alpha, beta-ethylenedicarboxylic acid having an alkyl radical of from one to four carbon atoms on the imide nitrogen with a completely aliphatic monoolefinic hydrocarbon of from two to eight carbon atoms having a terminal methylene ($CH_2$) group.

6. A copolymer of N-n-butylmaleimide with diisobutylene.

7. A copolymer of N-isobutylmaleimide with diisobutylene.

HAROLD WILFRED ARNOLD.
MERLIN MARTIN BRUBAKER.
GEORGE LOWRANCE DOROUGH.

CERTIFICATE OF CORRECTION.

Patent No. 2,301,356. November 10, 1942.

HAROLD WILFRED ARNOLD, ET AL.

It is hereby certified that error appears in the printed specification of the above numbered patent requiring correction as follows: Page 1, first column, line 15, for "e. e." read --e. g.--; and that the said Letters Patent should be read with this correction therein that the same may conform to the record of the case in the Patent Office.

Signed and sealed this 5th day of January, A. D. 1943.

Henry Van Arsdale,
Acting Commissioner of Patents.

(Seal)